Patented May 11, 1937

2,079,634

UNITED STATES PATENT OFFICE 2,079,634

MANUFACTURE OF YEAST

Alfred Schultz, New York, N. Y., assignor to Standard Brands Incorporated, New York, N. Y., a corporation of Delaware No Drawing. Application August 18, 1932, Serial No. 629,393

12 Claims. (Cl. 195—76)

The invention relates to a method for the manufacture of yeast, and includes correlated improvements and discoveries whereby the enzyme content of the yeast may be enhanced.

It is an object of the invention to provide a process in accordance with which there is obtained a yeast having an increased invertase content.

A further object of the invention is to provide a process for obtaining a yeast of increased invertase content, that may be readily, effectively and economically practiced on a commercial scale.

Another object of the invention is to provide as an article of manufacture a yeast product of normal color and good baking strength but characterized by an invertase activity greater than that normally present in yeast.

Other objects of the invention will in part be obvious and will in part appear hereinafter.

The invention accordingly comprises the several steps and the relation of one or more of such steps with respect to each of the others and the yeast product possessing the features and properties which are exemplified in the following detailed disclosure, and the scope of the invention will be indicated in the claims.

In the practice of the invention, a yeast product having increased enzymic activity may be manufactured by propagating yeast in a nutrient solution containing sugar material and yeast nourishing inorganic salts with aeration and controlled acidity, and then effecting fermentation under reduction aeration, or at a lower rate of aeration than that employed during the propagating period, with addition of a yeast nourishing inorganic salt, an introduction of a fermentable sugar material during the fermentation period, and control of the acidity of the medium at a value of pH 4.5 to 6.0.

More particularly, the process entails seeding a fermenter containing a desired quantity of water with yeast, and aerating. A quantity of sugar material, as molasses, which has been previously treated to clarify and render it more suitable for the production of yeast, may be gradually added throughout the propagating period, e. g., about eight hours. The solution in which the propagation takes place may contain a phosphate, as ammonium acid phosphate or potassium acid phosphate, ammonium sulfate, potassium nitrate, magnesium nitrate and the like, in requisite amount and the acidity may be controlled by the addition of ammonia, for example, aqua ammonia.

When the yeast has increased several fold, the aeration is reduced to about one-third of that used during the propagating period, and fermentation carried out with the addition of a yeast nourishing inorganic salt if desired, and introduction of a fermentable sugar, as molasses, during the fermentation period, which may be about three hours. The acidity of the medium is controlled during this period at a value of from pH 4.5 to 6.0. During the latter or fermentation stage the enzyme content of the yeast is increased and alcohol is formed, but the yeast does not multiply to any considerable extent. It is desirable, during the fermentation period, to proceed in a manner such that the alcohol content does not become unduly great.

As an illustrative embodiment of a manner in which the invention may be practiced, the following examples are given:

Example I

A fermenter containing about 10,000 gallons of water is seeded with about 1200 lbs. of stock yeast. Aeration is then commenced and air in an amount of about 2,000 cubic feet per minute passed through the yeast-water mixture. A molasses which has been treated to clarify and otherwise render it suitable for the production of yeast, in an amount of about 6,000 lbs., is gradually introduced, or zulaufed into the fermenter during the propagating period, which is usually about eight hours. The requisite amount of yeast nourishing inorganic salts are added, such as ammonium acid phosphate, potassium hydrogen phosphate, ammonium sulfate, etc., and the acidity controlled at a value of about pH 4.5 at the start, with gradual rise to about pH 5.5 at the end of the propagating period. After about eight hours the yeast content will have increased several fold to approximately 6,000 lbs. A fermentation is now effected by reducing the aeration to a rate of about 600 cubic feet of air per minute, with addition of about 0.4% ammonium acid phosphate, as a yeast nourishing inorganic salt, and at a temperature of about 25°–30° C. This fermentation is allowed to proceed for about three hours. During each hour about 1,200 lbs. of treated molasses are introduced by zulaufing and the acidity is controlled between pH 4.5 and 6.0 by the addition of aqua ammonia. The yeast may then be separated and pressed in the usual manner, whereupon it is ready for use.

Example II

Yeast which has been propagated in the manner described in Example I may be separated from the medium in which it was grown and, either as such separated yeast or subsequent to pressing, it may be subjected to a fermentation treatment whereby the invertase content is increased in the following manner. To a fermentation vessel containing about 6 liters of water, 12 grams ammonium di-hydrogen phosphate, 12 grams potassium di-hydrogen phosphate, 3 grams potassium nitrate, and 6 grams magnesium nitrate, there may be added about 300 grams of seed yeast. The temperature may be held at about 30° C., and the mass aerated at a rate of about 110 cubic feet per hour. The fermentation may be allowed to proceed for a period of about three hours and, during this period, treated molasses in an amount of from 15-25% of the amount of the seed yeast is introduced, preferably by zulaufing during each hour with controlled acidity conditions at a value of pH 4.5 to 6.0 by means of aqua ammonia or sodium bicarbonate. The yeast may be separated and pressed in the usual manner, and possesses an invertase activity practically double the original or normal activity of the yeast.

In accordance with the foregoing procedures there is produced a yeast having an invertase content greater than that normally present to an extent of about 2 to 3.5 times. This may be readily determined by inoculating a sugar solution of a given degree of polarization with normal yeast and another such solution with yeast prepared in accordance with this process, and permitting inversion to proceed for a definite time interval. At the end of the time interval, the change in polarization is determined and the polarization constant calculated. More particularly the inverting activity or the invertase content of yeast produced in accordance with the method described herein relative to that contained in the usual or normal baker's yeast may be determined by inoculating a 10% cane sugar solution at a constant temperature of about 30° C., and having a pH value of 4.7 to 5 with equal amounts of the yeast, and measuring the polarization initially and after a period of about 4 to 5 hours. The rate of reaction constant K is calculated through use of the following formula:

$$K=\frac{1}{t} \log \frac{a}{a-x}$$

in which $t$ represents reaction time, $a$ rotation of the sugar solution initially and $a-x$ the rotation at the time $t$. When equal quantities of yeast are taken this constant measures the invertase strength or content thereof. Thus, it has been found that a yeast produced in accordance with the foregoing procedure has the value $K=.01$, whereas a normal baker's yeast untreated had a value of $K=.0051$. The yeast prepared as above described, therefore, has an invertase content twice that of the normal baker's yeast. I have found that the treated, or conditioned yeast has a materially greater inverting power than the control, or untreated, yeast. Further, the process gives a high yield, e. g., about five fold, of yeast of normal color and good baking strength or quality.

The foregoing procedures set forth certain specific conditions which yield a yeast having the desired properties. It will be realized that although the invention relates to a biological process, nevertheless in its broader aspects it is not limited to the specific conditions hereinbefore set forth, but that these conditions may be varied, as rate of aeration, rate of introduction of molasses, acidity of solution, type of yeast nourishing inorganic salt used, etc., without departing from the spirit and scope of the invention. Furthermore, it is desired to mention that the fermentation period in the treatment of the yeast need not directly follow the propagating period although this mode of procedure is particularly desirable from a commercial standpoint because of continuity of operation. If desired, however, the yeast may be separated following a propagating period and then subjected to a fermentation treatment with the addition of a yeast nourishing inorganic salt and of molasses, or the yeast may be added to water containing the principal salts present in molasses, as sodium, potassium, magnesium and calcium phosphates, sulfates, nitrates, etc., and gradually introducing a fermentable sugar, as cane sugar, beet sugar, dextrose, maltose, and the like. It is preferred to utilize molasses in view of its ready availability and low cost. The yeasts employed are those strains commonly used for baking purposes, known as baker's yeast, and I have found that these strains are especially susceptible to having their invertase content increased. It may be added that the yeast obtained according to the invention, and having an enriched invertase content produces on autolysis an invertase preparation containing less extraneous material than an invertase preparation prepared in a similar manner from ordinary normal yeast.

It will be realized that the rates of aeration are variable and depend upon the size of the receptacle in which the yeast is being manufactured—hence while the appended claims recite a certain rate of aeration, such rate is for the production of yeast in a fermenter containing 10,000 gals. of water, and other rates will pertain where fermenters of different size are utilized.

Since certain changes in carrying out the above process and certain modifications in the properties and qualities of the yeast product encompassed by the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for the manufacture of yeast having an invertase content several times that of normal yeast which comprises propagating yeast in a nutrient solution containing sugar material and yeast nourishing inorganic salts with aeration throughout the propagating period at a rate of about 200 cubic feet per minute per 1,000 gallons of nutrient solution under the propagating conditions whereby a well nourished yeast is obtained, and then effecting a yeast fermentation of a yeast fermentable sugar by such produced yeast at a reduced rate of aeration which prevents any considerable propagation during said fermentation with addition of a yeast nourishing inorganic salt to the fermenting medium, introducing a yeast fermentable sugar material into said medium throughout the fermentation period, and controlling the acidity of the medium and maintaining the same during said propagation and said fermentation at a pH value of 4.5 to 6.0.

2. A process for the manufacture of yeast having an invertase content several times that of normal yeast which comprises propagating yeast in a nutrient solution containing sugar material and yeast nourishing inorganic salts with aeration throughout the propagating period at a rate of about 200 cubic feet per minute per 1,000 gallons of nutrient solution under the propagating conditions whereby a well nourished yeast is obtained, and then effecting a yeast fermentation of a yeast fermentable sugar by such produced yeast at a reduced rate of aeration which prevents any considerable propagation during said fermentation with addition of a yeast nourishing inorganic salt to the fermenting medium, introducing molasses into said medium throughout the fermentation period, and controlling the acidity of the medium and maintaining the same during said propagation and said fermentation at a pH value of 4.5 to 6.0.

3. A process for the manufacture of yeast having an invertase content several times that of normal yeast which comprises propagating yeast in a nutrient solution containing sugar material and yeast nourishing inorganic salts with aeration throughout the propagating period at a rate of about 200 cubic feet per minute per 1,000 gallons of nutrient solution under the propagating conditions whereby a well nourished yeast is obtained, and then effecting a yeast fermentation of a yeast fermentable sugar by such produced yeast at a reduced rate of aeration which prevents any considerable propagation during said fermentation with addition of a yeast nourishing inorganic salt to the fermenting medium, continuously introducing molasses into said medium throughout the fermentation period, and controlling the acidity of the medium and maintaining the same during said propagation and said fermentation at a pH value of 4.5 to 6.0.

4. A process for the manufacture of yeast having an invertase content several times that of normal yeast which comprises propagating yeast in a nutrient solution containing sugar material and yeast nourishing inorganic salts with aeration throughout the propagating period at a rate of about 200 cubic feet per minute per 1,000 gallons of nutrient solution under the propagating conditions whereby a well nourished yeast is obtained, and then effecting a yeast fermentation of a yeast fermentable sugar by such produced yeast at a reduced rate of aeration which prevents any considerable propagation during said fermentation with addition of a yeast nourishing inorganic salt to the fermenting medium, continuously introducing molasses into said medium throughout the fermentation period, and controlling the acidity of the medium and maintaining the same during said propagation and said fermentation at a pH value of 4.5 to 6.0 by the addition of ammonia.

5. A process for the manufacture of yeast having an invertase content several times that of normal yeast which comprises propagating yeast in a nutrient solution containing sugar material and yeast nourishing inorganic salts with aeration throughout the propagating period at a rate of about 200 cubic feet per minute per 1,000 gallons of nutrient solution under the propagating conditions whereby a well nourished yeast is obtained, and then effecting a yeast fermentation of a yeast fermentable sugar by such produced yeast at a reduced rate of aeration which prevents any considerable propagation during said fermentation with addition of ammonium acid phosphate to the fermenting medium, continuously introducing molasses into said medium throughout the fermentation period, and controlling the acidity of the medium and maintaining the same during said propagation and said fermentation at a pH value of 4.5 to 6.0 by the addition of aqua ammonia.

6. In a process for the manufacture of yeast, the improvement which comprises producing a yeast having an invertase content several times that of normal yeast by first propagating yeast in a nutrient solution with aeration, and then effecting a yeast fermentation of the thus propagated yeast at a rate of aeration which will prevent any considerable propagation during said fermentation in a solution containing yeast nourishing inorganic salts, introducing a yeast fermentable sugar material into the fermenting solution throughout the fermentation period, and controlling the acidity of the medium and maintaining the same during said propagation and said fermentation at a pH value of 4.5 to 6.0.

7. A process for the manufacture of yeast having an invertase content several times that of normal yeast which comprises propagating yeast in a nutrient solution containing sugar material and yeast nourishing inorganic salts with aeration throughout the propagating period at a rate of about 200 cubic feet per minute per 1,000 gallons of nutrient solution under the propagating conditions whereby a well nourished yeast is obtained and until the yeast content has increased about five fold, and then effecting without a separation of the yeast so produced, a yeast fermentation of a yeast fermentable sugar at a reduced rate of aeration which prevents any considerable propagation during said fermentation with addition of a yeast nourishing inorganic salt to the fermenting medium, introducing a yeast fermentable sugar into said medium throughout the fermentation period, and controlling the acidity of the medium and maintaining the same during said propagation and said fermentation at a pH value of 4.5 to 6.0.

8. A process for the manufacture of yeast having an invertase content several times that of normal yeast which comprises propagating yeast in a nutrient solution containing sugar material and yeast nourishing inorganic salts with aeration throughout the propagating period at a rate of about 200 cubic feet per minute per 1,000 gallons of nutrient solution under the propagating conditions whereby a well nourished yeast is obtained, and then effecting a yeast fermentation of a yeast fermentable sugar by such a produced yeast at a reduced rate of aeration which prevents any considerable propagation during said fermentation with introduction of a yeast fermentable sugar material into the fermenting medium throughout the fermentation period, and controlling the acidity of the medium and maintaining the same during said propagation and said fermentation at a pH value of 4.5 to 6.0.

9. A process for the manufacture of yeast which comprises propagating yeast by seeding a nutrient solution having a volume of about 10,000 gallons containing yeast nourishing inorganic salts with about 1,200 lbs. of yeast, aerating at a rate of about 2,000 cubic feet per minute, gradually introducing about 6,000 lbs. of molasses during a propagating period of about eight hours, controlling the acidity of the solution at a value of pH 4.5 to 6.0, and then effecting a yeast fermentation of a yeast fermentable sugar in the propagating medium with aeration at a rate of about 600 cubic feet per minute with the addition of an ammonium salt into the fermenting medium, gradually introducing about 1,200 lbs. of molasses thereinto during each hour for about three hours, and controlling the acidity of the solution during said propagation and said fermentation at a value of pH 4.5 to 6.0 by the addition of aqua ammonia.

10. In a process for the manufacture of yeast having an invertase content several times that of normal yeast the improvement which comprises placing yeast in a nutrient solution and effecting a yeast fermentation of a yeast fermentable sugar with an aeration rate such that any considerable propagation during said fermentation is prevented, adding to said nutrient solution a yeast nourishing inorganic salt, introducing molasses into said solution throughout the fermentation period, and controlling the acidity of the medium and maintaining the same during said fermentation at a pH value of 4.5 to 6.0.

11. In a process for the manufacture of yeast having an invertase content several times that of normal yeast the improvement which comprises placing yeast in a nutrient solution and effecting a yeast fermentation of a yeast fermentable sugar with an aeration rate such that any considerable propagation during said fermentation is prevented, adding to said nutrient solution an ammonium salt, continuously introducing molasses into said solution throughout the fermentation period, and controlling the acidity of the medium and maintaining the same during said fermentation at a pH value of 4.5 to 6.0 by the addition of aqua ammonia.

12. In a process for the manufacture of yeast having an invertase content several times that of normal yeast the improvement which comprises placing yeast in a nutrient solution and effecting a yeast fermentation of a yeast fermentable sugar with an aeration rate such that any considerable propagation during said fermentation is prevented, adding to said nutrient solution an ammonium salt, continuously introducing molasses into said solution throughout a period of about three hours, and controlling the acidity of the medium and maintaining the same during said fermentation at a pH value of 4.5 to 6.0 by the addition of aqua ammonia.

ALFRED SCHULTZ.